(12) United States Patent
Barajas

(10) Patent No.: US 9,715,418 B2
(45) Date of Patent: Jul. 25, 2017

(54) PERFORMANCE PROBLEM DETECTION IN ARRAYS OF SIMILAR HARDWARE

(71) Applicant: International Business Machines Corporation, Armonk, NY (US)

(72) Inventor: Felipe A. Barajas, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 14/558,581

(22) Filed: Dec. 2, 2014

(65) Prior Publication Data

US 2016/0154688 A1 Jun. 2, 2016

(51) Int. Cl.
G06F 11/00 (2006.01)
G06F 11/07 (2006.01)
G06F 11/34 (2006.01)

(52) U.S. Cl.
CPC ...... *G06F 11/0727* (2013.01); *G06F 11/0751* (2013.01); *G06F 11/34* (2013.01)

(58) Field of Classification Search
CPC .. G06F 11/0727; G06F 11/34; G06F 11/0751; G06F 11/079; G06F 11/0721
USPC .......................................................... 714/37
See application file for complete search history.

(56) References Cited

U.S. PATENT DOCUMENTS

| | | |
|---|---|---|
| 5,422,890 A | 6/1995 | Klingsporn et al. |
| 5,943,670 A | 8/1999 | Prager |
| 7,136,768 B1 | 11/2006 | Shah et al. |
| 7,155,634 B1 | 12/2006 | Le Graverand et al. |
| 7,451,355 B1 | 11/2008 | Coatney et al. |
| 7,536,158 B2 * | 5/2009 | Bottomley ............. H04B 1/712 375/150 |
| 7,580,956 B1 | 8/2009 | Xin et al. |
| 7,650,531 B2 | 1/2010 | Yeung et al. |
| 7,701,700 B2 | 4/2010 | Hall et al. |
| 7,743,284 B1 | 6/2010 | Taylor et al. |
| 8,035,409 B2 | 10/2011 | Deutsch et al. |
| 8,352,790 B2 | 1/2013 | Nakagawa et al. |
| 8,751,858 B2 * | 6/2014 | Barajas ............... G06F 11/0727 714/6.1 |
| 9,672,086 | 6/2017 | Barajas |
| 2005/0013352 A1 * | 1/2005 | Hottinen .............. H04B 1/1027 375/219 |
| 2005/0149570 A1 | 7/2005 | Sasaki et al. |

(Continued)

OTHER PUBLICATIONS

Shah et al., "Disk Drive Vintage and Its Effect on Reliability," IEEE, RAMS 2004, 2004, pp. 163-167.

(Continued)

*Primary Examiner* — Yair Leibovich
(74) *Attorney, Agent, or Firm* — Zilka-Kotab, P.C.

(57) ABSTRACT

Embodiments described herein include detecting under-performing devices using a correlational matrix in which devices are compared with one another in order to establish which devices are performing significantly different, e.g. under-performing, than the rest. According to one embodiment, a method includes generating a vector for each of a plurality of hardware devices. Using a hardware processor, a correlational matrix representing projections of the vectors against each other is created. A determination is made as to which hardware device is least like the other hardware devices based on the correlational matrix. A result of the determining is output.

20 Claims, 7 Drawing Sheets

(56) References Cited

U.S. PATENT DOCUMENTS

| | | |
|---|---|---|
| 2006/0123189 A1 | 6/2006 | Bitner et al. |
| 2008/0291887 A1* | 11/2008 | Cairns ................. H04B 1/7115 370/342 |
| 2008/0294651 A1 | 11/2008 | Masuyama et al. |
| 2009/0049396 A1 | 2/2009 | Fisher et al. |
| 2009/0180567 A1* | 7/2009 | She ..................... H04B 7/0408 375/267 |
| 2012/0297253 A1* | 11/2012 | Barajas ............... G06F 11/0727 714/42 |
| 2014/0245072 A1 | 8/2014 | Barajas |

OTHER PUBLICATIONS

Shah et al., "Reliability Analysis of Disk Drive Failure Mechanisms," IEEE, RAMS 2005, 2005, pp. 226-231.
Tal et al., "New Method and Apparatus for Device Failure Risk Assessment," IP.Com, Motorola Inc., Oct. 31, 2007, pp. 1-5.
List of IBM Patents or Patent Applications Treated as Related.
Final Office Action from U.S. Appl. No. 14/267,440, dated Apr. 8, 2016.
Barajas, U.S. Appl. No. 13/112,922, filed May 20, 2011.
Non-Final Office Action from U.S. Appl. No. 13/112,922, dated May 23, 2013.
Final Office Action from U.S. Appl. No. 13/112,922, dated Sep. 30, 2013.
Notice of Allowance from U.S. Appl. No. 13/112,922, dated Jan. 24, 2014.
Barajas, U.S. Appl. No. 14/267,440, filed May 1, 2014.
Non-Final Office Action from U.S. Appl. No. 14/267,440, dated Dec. 2, 2015.
Notice of Allowance from U.S. Appl. No. 14/267,440, dated Jun. 29, 2016.
Corrected Notice of Allowance from U.S. Appl. No. 14/267,440, dated Jul. 28, 2016.

* cited by examiner

500

| Device | IO Size (KB) | Avg IO Time (ms) |
|---|---|---|
| Dev1 | 102 | 15 |
| Dev2 | 105 | 17 |
| Dev3 | 105 | 15 |
| Dev4 | 103 | 16 |
| Dev5 | 110 | 42 |
| Mean | 105 | 21 |

FIG. 5

| | D1 | D2 | D3 | D4 | D5 |
|---|---|---|---|---|---|
| D1 | 1 | 0.894 | 0.894 | 0.997 | -0.974 |
| D2 | 0.894 | 1 | 1 | 0.928 | -0.973 |
| D3 | 0.894 | 1 | 1 | 0.928 | -0.973 |
| D4 | 0.997 | 0.928 | 0.928 | 1 | -0.989 |
| D5 | -0.974 | -0.973 | -0.973 | -0.989 | 1 |

PERFORMANCE PROBLEM DETECTION IN ARRAYS OF SIMILAR HARDWARE

BACKGROUND

The present invention relates to problem isolation, and more specifically, this invention relates to monitoring for, and detection of, performance problems in hardware.

Hardware systems, such as virtual tape servers, network systems, etc. often include multiple hardware components that function in a very similar manner. For example, in a virtual tape server such as the IBM TS7700, include a disk cache subsystem which gets installed with a gamut of physical disk drive media (DDM).

Due to the nature of virtual tape servers, if any number of DDMs are defective (e.g., suffering from faulty microcode, manufacturing problems, mechanical breakdown, etc.), the problem is not easily identifiable and/or avoidable once the DDM is installed in virtual tape system in the field.

By analogy, similar problems may occur in deployments of any type of hardware. Determining performance problems of hardware systems, e.g., such as those described above, is often best performed with the use of fine-tuned values and/or thresholds. However, establishing performance thresholds can be problematic, because if any device passes below the threshold (e.g., even in a case where the device is not under-performing), the device will likely be classified as under-performing even if it is not. Furthermore, an incorrectly set threshold may lead to the mis-categorization of a device, which in itself could potentially lead to a device functioning improperly and/or not at all. These issues often require device thresholds to be frequently fine-tuned, which itself leads to a plethora of problems.

BRIEF SUMMARY

Embodiments described herein include detecting underperforming devices using a correlational matrix in which devices are compared with one another in order to establish which devices are performing significantly different, e.g., under-performing, than the rest.

According to one embodiment, a method includes generating a vector for each of a plurality of hardware devices. Using a hardware processor, a correlational matrix representing projections of the vectors against each other is created. A determination is made as to which hardware device is least like the other hardware devices based on the correlational matrix. A result of the determining is output. One advantage of this approach is that it allows for direct comparison between devices without relying on thresholds or minimum/maximum values in order to determine performance issues.

According to another embodiment, a computer program product for detecting an underperforming hardware device includes a computer readable storage medium having program instructions embodied therewith. The computer program product includes program instructions readable and/or executable by a processor to cause the processor to perform the foregoing method.

According to yet another embodiment, a system includes a hardware processor and logic integrated with and/or executable by the processor. The logic is configured to cause performance of the foregoing method.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 5 illustrates an example of a matrix of device performance parameters, according to one embodiment.

DETAILED DESCRIPTION

Figure 1:
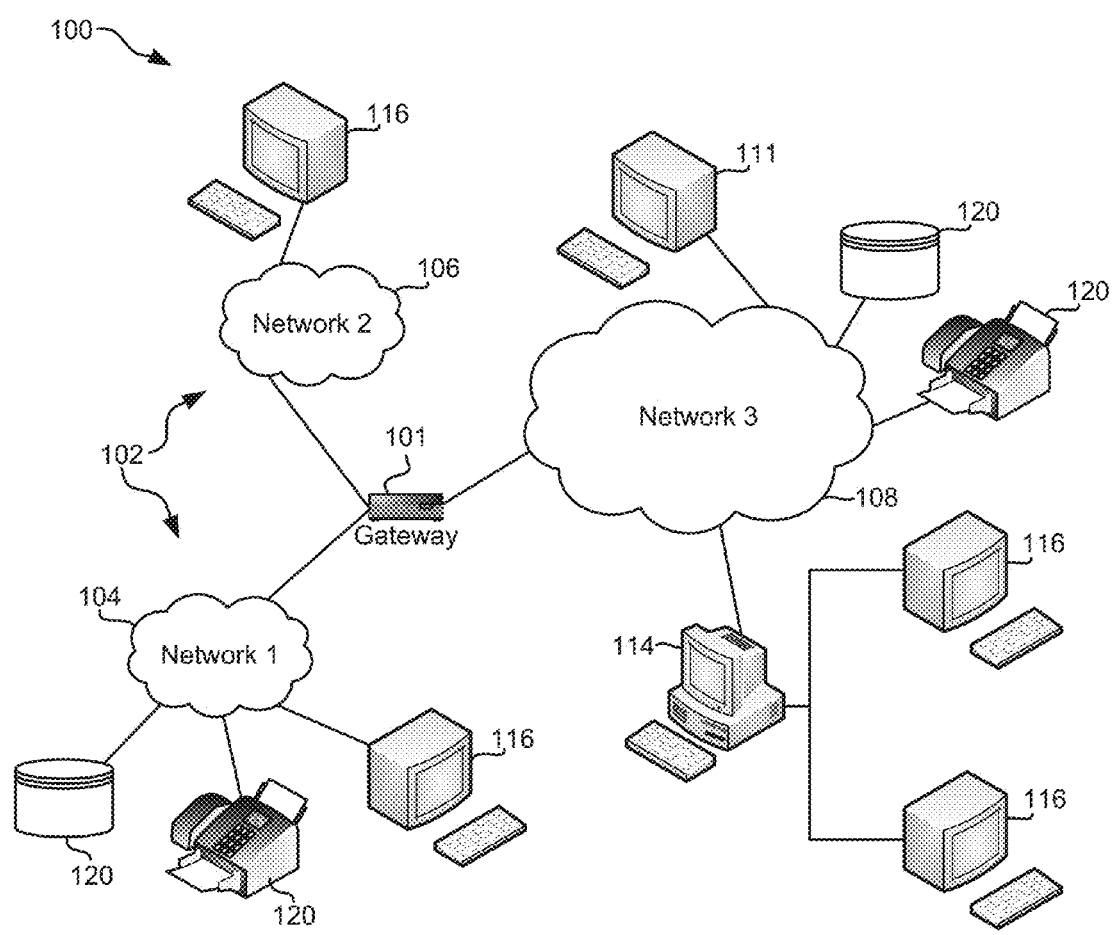
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for monitoring for, and detection of, performance problems in similar hardware.

In one general embodiment, a method includes generating a vector for each of a plurality of hardware devices. Using a hardware processor, a correlational matrix representing projections of the vectors against each other is created. A determination is made as to which hardware device is least like the other hardware devices based on the correlational matrix. A result of the determining is output. One advantage of this approach is that it allows for direct comparison between devices without relying on thresholds or minimum/maximum values in order to determine performance issues.

In another general embodiment, a computer program product for detecting an underperforming hardware device includes a computer readable storage medium having program instructions embodied therewith. The computer program product includes program instructions readable and/or executable by a processor to cause the processor to: generate, by the processor, a vector for each of a plurality of hardware devices, create, by the processor, a correlational matrix representing projections of the vectors against each other, determine, by the processor, which hardware device is least like the other hardware devices based on the correlational matrix, and output, by the processor, a result of the determining.

In yet another general embodiment, a system includes a hardware processor and logic integrated with and/or executable by the processor. The logic is configured to generate a vector for each of a plurality of hardware devices, create a correlational matrix representing projections of the vectors against each other, determine which hardware device is least like the other hardware devices based on the correlational matrix, and output a result of the determining.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
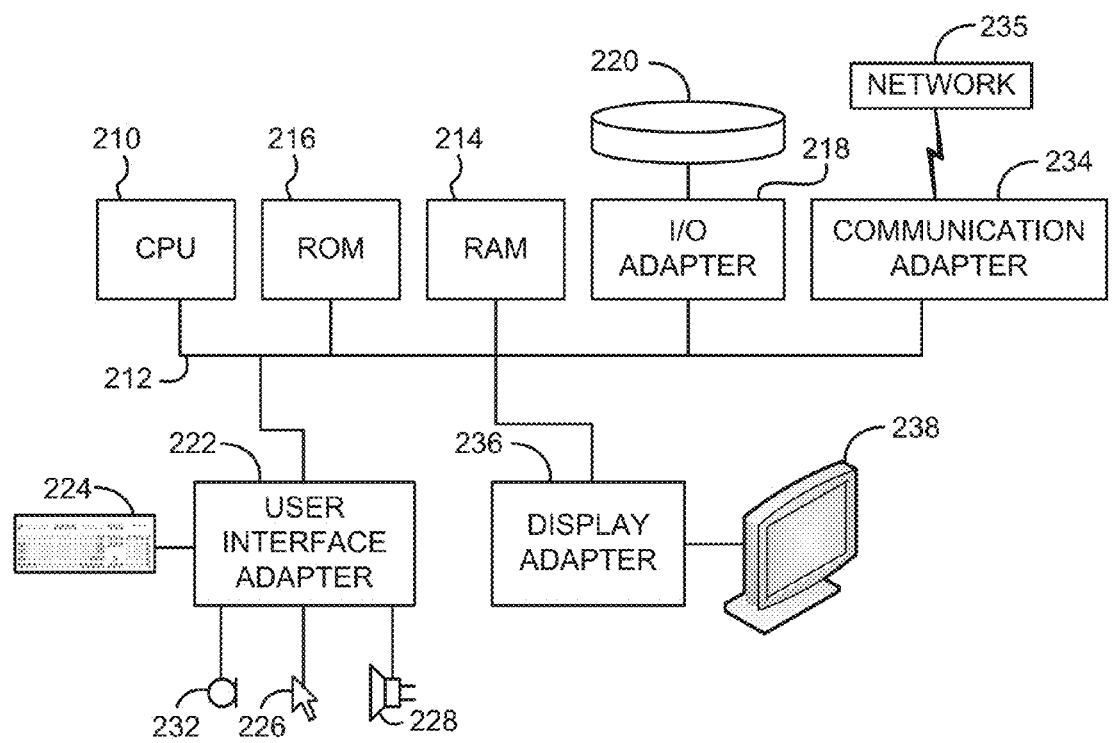
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
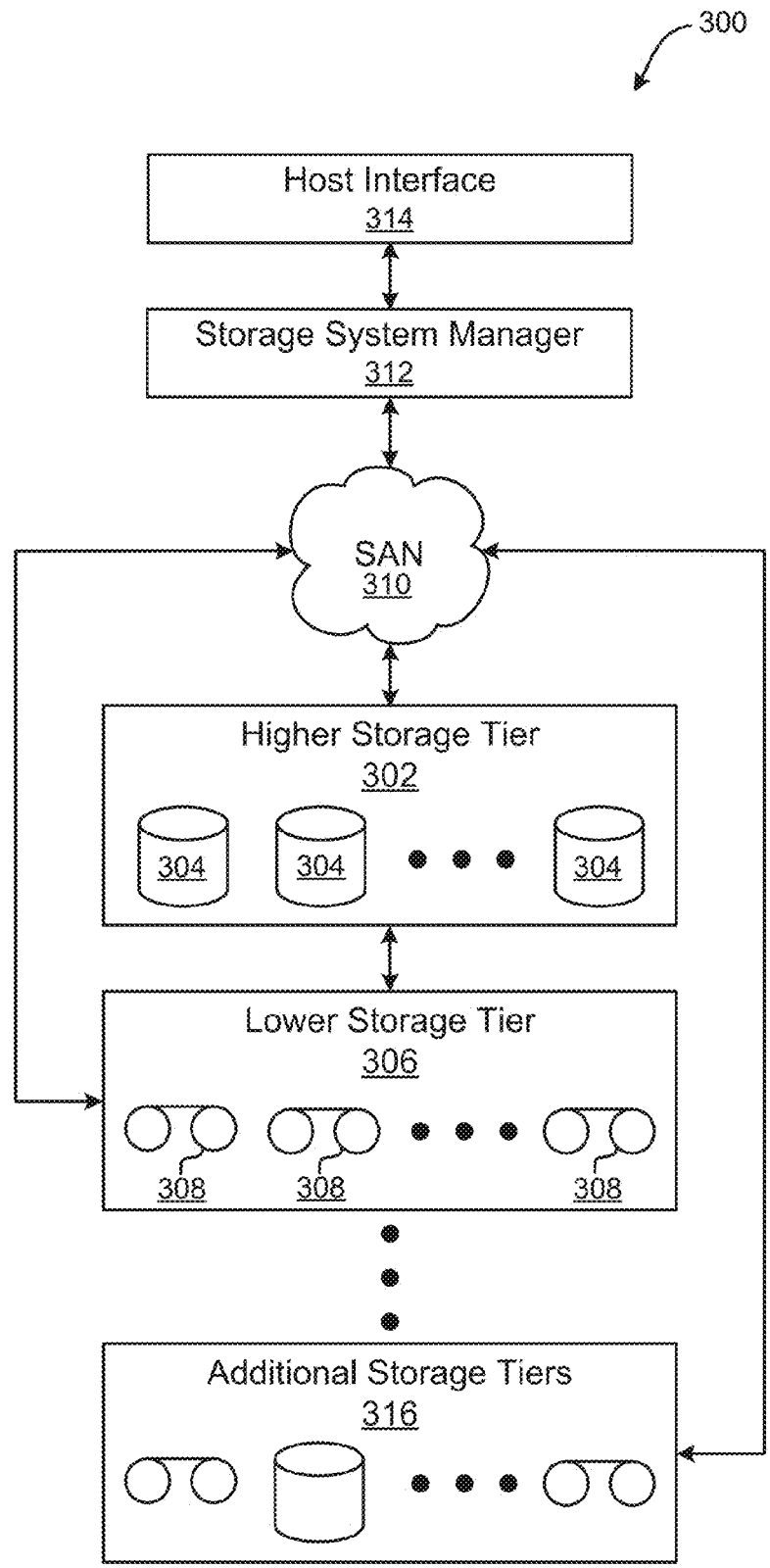
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tiers) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be apart of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Embodiments described herein include detecting under-performing devices using a correlational matrix in which devices are compared with one another in order to establish which devices are performing significantly different, e.g. under-performing, than the rest.

Figure 4:
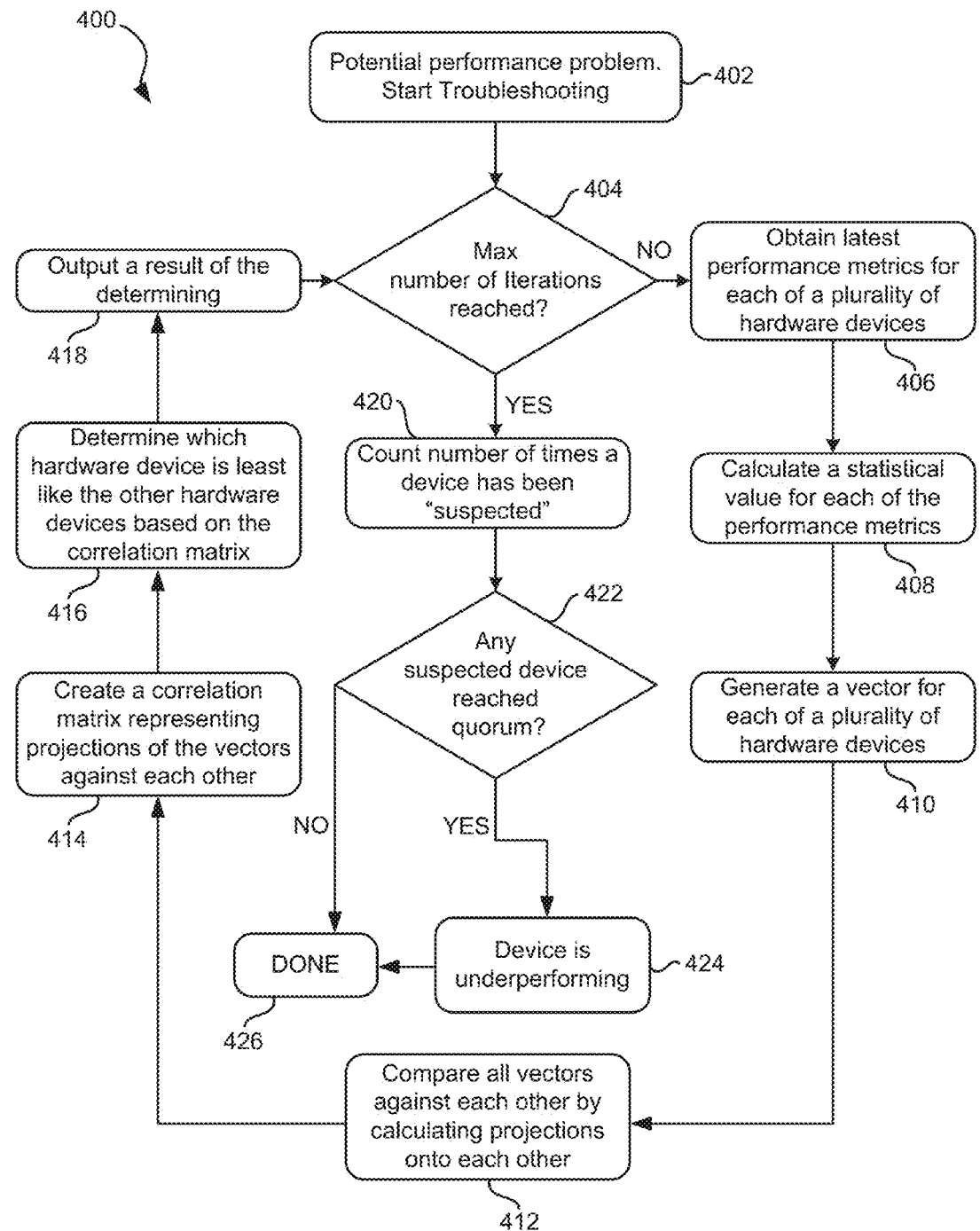
FIG. 4 illustrates a method according to one embodiment.

Now referring to FIG. 4, a method 400 is shown according to one embodiment. The method 400 may be performed in accordance with the present invention in any of the environments depicted in FIGS. 1-6, among others, in various embodiments. Of course, more or less operations than those specifically described in FIG. 4 may be included in method 400, as would be understood by one of skill in the art upon reading the present descriptions.

Method 400 is a troubleshooting process which may be used to distinguish which devices in a determined group of similar devices, e.g., where each device is expected to operate at similar performance, are under-performing. Such devices may include e.g. drives, network cards, CPUs, etc. depending on the embodiment. As shown in FIG. 4, method 400 may be initiated when a potential performance problem is suspected, as noted in operation 402. For example, operation 402 an indication of a suspected performance problem may be received from a user, result from detection of a trigger condition, result from a detected performance drop of a system or component thereof, etc. Troubleshooting may then be initiated.

Once troubleshooting of the group of similar devices has been initiated, a determined number of iterations of various operations of the method 400 may be performed e.g. in order to compensate for noise, avoid mischaracterization of a device, etc. See operation 404. Furthermore, in order to compensate for noise, a pre-determined period of time e.g. a sleep cycle may be set between each iteration in a given set of iterations. During each iteration, a selected or predefined number e.g. two, three, four, etc. of performance parameters of each device may be compared, as will be described in further detail below. Because when method 400 is initiated, the maximum number of iterations may have not yet been performed, method 400 may initially follow the "NO" logic path of decision 404 in order to perform an iteration e.g. in order to determine if any devices in a determined group of similar devices are under-performing.

In performing an iteration, as noted by operation 406, method 400 includes obtaining the latest performance metrics e.g. from logging function, survey, etc., for each of a plurality of hardware devices. The performance metrics for each of the hardware devices may include any known metric by which performance may be compared, such as but not limited to throughputs, percentage of utilization of a processor, inputs-outputs/second (IOs/sec) of a device, error rates, etc.

As noted in operation 408, a statistical value, e.g., mean, median, mode, etc. for each of the performance metrics is calculated. The statistical values may be derived from performance metric values from all of the hardware devices under examination, and will be used to distinguish under-performing devices as will be described below. In a preferred embodiment, a mean is calculated for all parameters once all performance metrics are gathered. Each device will then have a certain deviation from this mean.

A vector may be generated for each of a plurality of hardware devices using the statistical value(s) calculated in operation 408 and using the performance metric(s) for each device, as noted in operation 410. Thus, the vector for each of the hardware devices may be based on one, two, or more performance metrics of the hardware devices. The number of performance metrics gathered for a particular device may determine the number of dimensions of the vector that will represent that device. By way of example only, two dimensions are primarily described for exemplary embodiments described herein. Furthermore, according to one embodiment, each of the vectors may be based on a deviation of the associated performance metric from the statistical value, e.g., as a deviation of the performance metric for that device from the mean of all such performance metrics from the devices under examination.

For example, referring to FIG. 5, exemplary performance metrics of exemplary devices Dev1, Dev2, Dev3, Dev4, Dev5 are included in a matrix 500. Devices Dev1, Dev2, Dev3, Dev4, Dev5 should have very similar hardware characteristics and therefore by design are expected to perform very similarly. In order to measure performance in the current example, the two exemplary performance parameters obtained for each device are IO size, which may be the amount of data (e.g. in bytes) a device has been asked to compute, and average IO time which may be completion time for each IO in the queue. In the bottom row, the means of each set of metrics are listed.

The calculated IO size mean may be subtracted from the Dev1 IO size e.g. 102−105=−3, in order to determine the deviation of Dev1's IO size from the IO size mean. Furthermore, the calculated average IO time mean may be subtracted from the Dev1 average IO time e.g. 15−21=−6, in order to determine the deviation of Dev1's average IO time from the average IO time mean. In performing similar calculations for vectors D2, D3, D4, D5 with their corresponding values in matrix 500, the following exemplary vectors may be generated:

$$D1=<-3,-6>$$

$$D2=<0,-4>$$

$$D3=<0,6>$$

$$D4=<-2,-5>$$

$$D5=<5,21>$$

These vectors identify the performance of each device such as:

<parameter1_deviation,parameter2_deviation> or simply $D1=<p1,p2>$

Projecting the performance vector of one device against the performance vector of another device or devices allows comparison between devices. With reference to operation 412, the vectors of a given type may be compared against one another, e.g. by calculating projections of the vector of one device onto a vector of another device, e.g., using known vector mathematics.

Figure 6A:
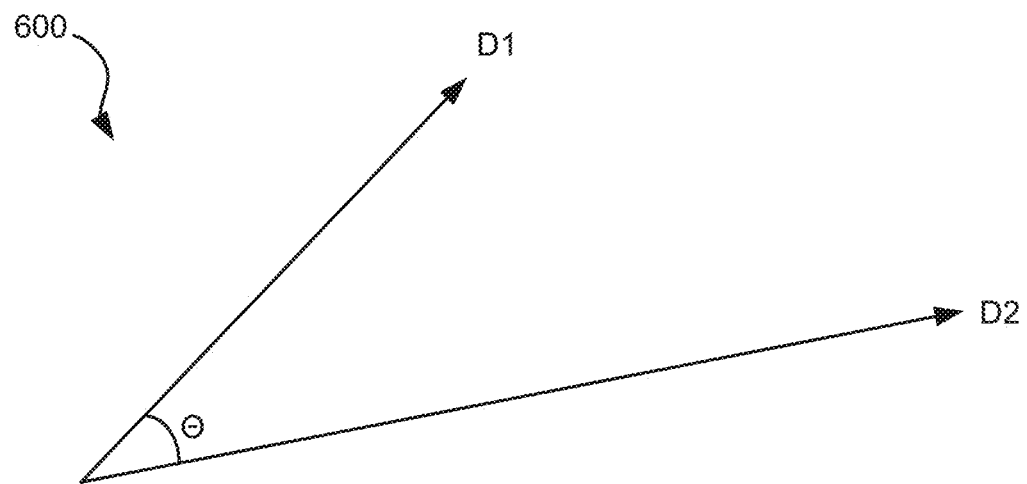
FIG. 6A illustrates two vectors plotted with a common origin, according to one embodiment.
Figure 6B:
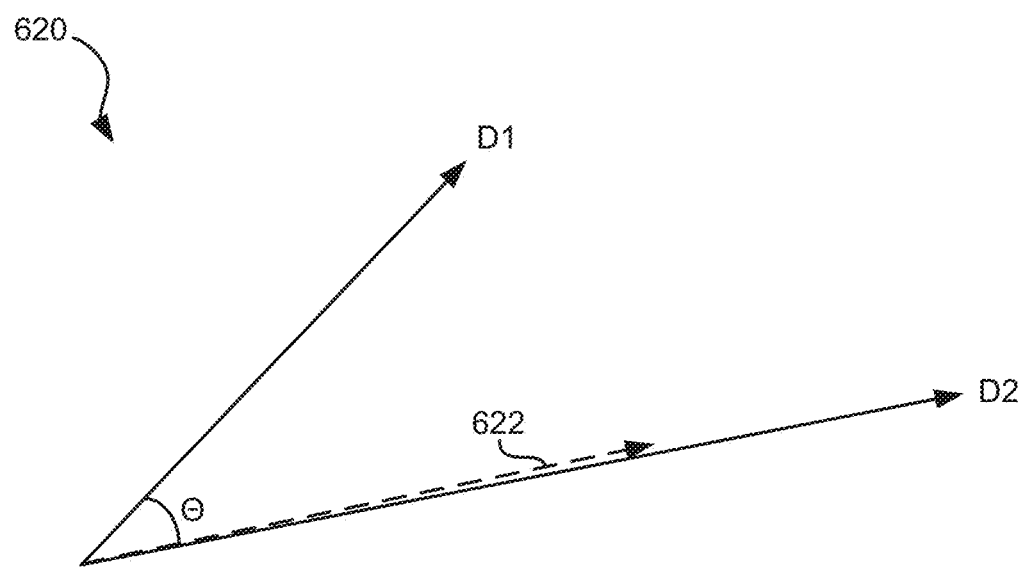
FIG. 6B illustrates projection of one vector onto another vector, according to one embodiment.

Illustrative embodiments describing the comparison of one vector against another vector will now be described in the description of FIG. 6A. FIG. 6A depicts a vector configuration 600 in accordance with one embodiment. As an option, the present vector configuration 600 may be implemented in conjunction with features from any other embodiment listed herein, such as those described with reference to the other FIGS. Of course, however, such vector configuration 600 and others presented herein may be used in various applications and/or in permutations which may or may not be specifically described in the illustrative embodiments listed herein. Further, the vector configuration 600 presented herein may be used in any desired environment.

Vector configuration 600 includes an exemplary first vector D1 for a first device plotted with the same origin as a second vector D2 for a second device. In this example, each of the vectors D1, D2 is based on at least two performance metrics of the associated hardware device. An angle Θ illustrates the degree of similarity between the vectors D1, D2. The closer the devices represented by vectors D1, D2 are performing with respect to each other, the closer value angle Θ is to zero degrees. Similarly, the further apart the devices represented by vectors D1, D2 are performing with respect to each other, the closer in value angle Θ comes to 180 degrees, where 180 degrees represents e.g. very differently performing hardware devices.

Each device vector may be compared against all others by calculating the projection of one vector against another. For example, vector configuration 620 of FIG. 6B includes the projection of vectors D1, D2 against one another, which may be calculated to determine the how closely two devices e.g. the devices whose performance parameters are represented by vectors e.g. D1, D2, are performing with respect to one another. Projection 622 illustrates the projection of vector D1 onto vector D2. The projections of the vectors against each other may be calculated using trigonometric functions of a type known in the art, applied to pairs of the vectors e.g. vectors D1, D2, as will now be described in greater detail below by FIG. 6C.

Figures 6C, 7:
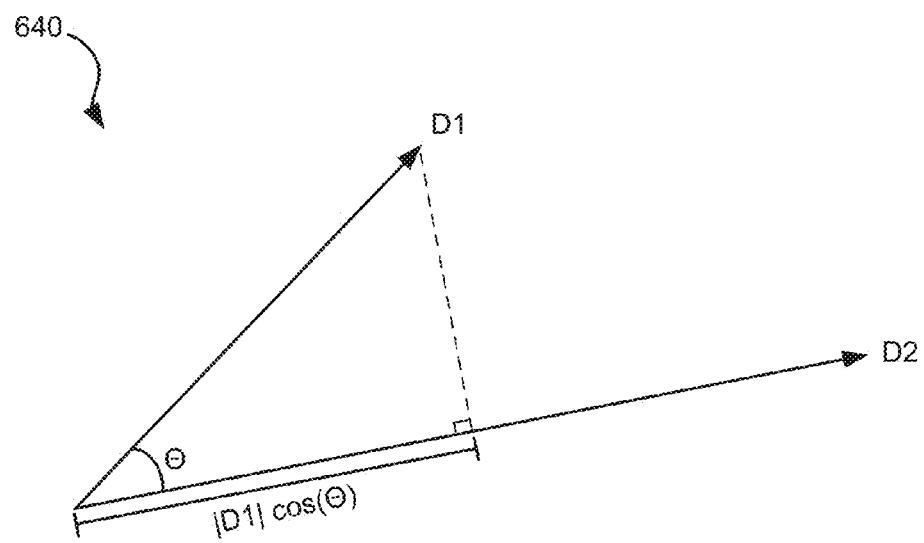
FIG. 6C illustrates two vectors plotted with a common origin, according to one embodiment.
FIG. 7 illustrates an example of a correlational matrix for comparing vectors, according to one embodiment.

Vector configuration 640 of FIG. 6C is shown in order to further illustrate a trigonometric function which may be used to calculate the projection of vectors D1, D2 against one another. For example, as shown in vector configuration 640, the projection of vector D1 onto vector D2 (herein represented by $D1_{D2}$) may be calculated using the following trigonometric formula:

$$D1_{D2}=|D1|*\cos(\Theta) \qquad \text{Equation 1}$$

where |D1| represents the absolute value of the vector length of vector D1 which is the square root of vector D1. Additionally, the cosine of the angle between vectors D1, D2 e.g. cos(Θ), may be calculated using the following trigonometric formula:

$$\cos(\Theta)=(D1 \cdot D2)/(|D1|*|D2|) \qquad \text{Equation 2}$$

where (D1·D2) represents the dot product of vectors D1, D2, and |D|*|D2| represents the absolute value of the magnitude of vectors D1 and D2, multiplied with one another. Using vectors D1=<−3, −6> and D2=<0, −4> in Equation 2 renders the following: cos(Θ)=(24)/(6.708*4|)≈0.894.

The results of the projection calculations can be put together into a correlational matrix to assist in determining if any of the devices whose parameters are represented by vectors e.g. D1, D2, D3, D4, D5 are under-performing, as will be described below by FIG. 7.

Referring again to FIG. 4, as noted in operations 414, a correlational matrix representing projections of the vectors against each other may be created. FIG. 7 depicts an exemplary correlational matrix 700 listing the projections of exemplary vectors D1-D5 (above) onto one another.

For example, correlational 704 e.g. which has an approximate value of 0.894, was calculated above in the description of FIG. 6C and Equation 2. From correlational matrix 700 it can be observed that the devices performing more similar to one another have vector projections with one another with a value that is close to 1, while the devices performing most dissimilar to one another have vector projections closer to −1.

Referring to operation 416 of FIG. 4, the hardware device which is performing least like the other hardware devices (e.g. under-performing) may be determined based on the correlational matrix (e.g. if in fact a device of the group is under-performing).

As previously described, the closer the value of the cos of the angle created by the projection of vector D2 onto vector D1 is to having a value of 1, the more similar the devices are performing with respect to one another. This is further noted by the correlation 702, which includes the projection of vector D1 onto vector D1. Because the angle created between the vector projection of a device onto itself is zero degrees, and the cos (0)=1, the direct measurement of a device against itself is 1 as noted in correlational matrix 700. This is because vectors diverge as they become less and less similar.

Correlation 706 is illustrated in FIG. 7 to have a value of −0.974. A negative correlation between two devices projected against each other using Equation 2 have a value closer to −1, e.g. D1 and D5, D2 and D5, D3 and D5, D4 and D5. From correlational matrix 700 the device associated with vector D5 may be determined to be underperforming during the current iteration when compared with other devices, e.g. those corresponding to D1, D2, D3 and D4. This determination may be made due to the fact that the devices corresponding to D1, D2, D3 and D4 each have performance similarities with each other e.g. the correlations between D1, D2, D3 and D4 are all close to the value of 1, while D1, D2, D3 and D4 each have correlations with vector D5 that is a negative value, which as described above equates to two very differently performing devices.

It should be noted that in other embodiments, the correlations of matrix 700 could also illustrate other trigonometric relationships between vectors e.g. D1, D2, D3, D4 and D5, in order to determine if any of the compared devices were underperforming.

Though this exemplary determination may be made during a single exemplary iteration, subsequent iterations may be performed (as will be described herein) in order to determine if the device associated with vector D5 is in fact under-performing. Moreover the device may be labeled as a "suspect" device, which will be described in greater detail below.

Referring back to FIG. 4, after determining which hardware device is least like the other hardware devices based on the correlational matrix (e.g. as described in exemplary correlational matrix 700), as noted in operation 418 a result of the determining may be output e.g., for determining if the "suspect" device is in fact under-performing, to an under-performing "watch list", to a user interface, etc.

As noted in FIG. 4, at some point after the determination made based on the correlational matrix has been output (in operation 418), decision 404 is again considered. If the predetermined number of iterations have not yet been performed, an additional iteration e.g. operations 406, 408, 410, 412, 414, 416, 418, etc., may be performed e.g. noted by the "NO" logic leading from decision 404. Additional iterations may be performed e.g. in order to determine if any "suspect" devices are in fact under-performing. The number of iterations may be predefined, received from a user, computed upon initiation of the troubleshooting process, etc.

As described above, during each iteration, the hardware device performing least like the other hardware devices in each iteration may be identified and stored e.g., the device may be added to a "suspect" list. Equivalently, a simple count may be kept denoting how many times a hardware device is least like the other hardware devices in each iteration. Moreover, when it is determined that the maximum number of iterations have been performed, method 400 may follow the "YES" logic path of decision 404 in order to analyze the "suspect" list of underperforming devices, as will now be described.

In operation 420, the number of times a "suspect" device has been suspected to be underperforming, e.g. by the determination of operation 416, may be counted.

According to decision 422, a number of times the hardware device found most often to be least like the other hardware devices is compared to a value, referred to herein as a "quorum." The quorum may be predefined, calculated based e.g. on some parameter of the method, selected by a user, retrieved from a database, etc.

According to an illustrative embodiment, the quorum may be defined as the (number of iterations/2)+1. Implementing quorum-based troubleshooting that is calculated based on the number of iterations performed in the embodiments described herein allows for a consistent method of performance troubleshooting that does not rely on thresholds that need to be continually fine-tuned. For example, if after the first iteration of method 400 a device is suspected to be potentially under-performing, and the determined quorum is set to six, the number of iterations would be 10 according to the formula above, and the device would be required to be suspected to be under-performing in five of the subsequent iterations in order for the device to be definitively determined to be under-performing.

If it is determined that the quorum has been met, the "suspect" device is determined to be underperforming in operation 424. The result of decision 422 and/or the determination of operation 424 may be output e.g. to a controller, to a user interface, to an alert system, to another application, etc. Depending on the preferred embodiment, once the "suspect" device is determined to be underperforming, according to operation 426, troubleshooting method 400 may end. The under-performing device may e.g. be updated, replaced by a performing device, monitored, etc.

Referring again to operation 422, when it is determined that the set quorum has not been met, the process terminates in operation 426. In another embodiment, the operations of troubleshooting method 400 may be again performed.

According to one embodiment, once operation 426 has been performed, the performance of any devices that were "suspect" devices in the troubleshooting of method, yet their performance parameters did not reach the quorum parameters of operation 422 may be e.g. further monitored, added to a troubleshooting history list, included in further troubleshooting, etc.

Various embodiments described herein allow for easy identification of a device with at least semi-consistent performance problems due to the under-performing devices behaving unlike the other devices in a system where all devices are expected to perform about equally.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
performing the following sub-process for a plurality of iterations:
generating a vector for each of a plurality of hardware devices,
creating, using a hardware processor, a correlational matrix representing projections of the vectors against each other, determining which hardware device is least like the other hardware devices based on the correlational matrix, and outputting a result of the determining;

identifying the hardware device that is most often least like the other hardware devices based on the results;

comparing a number of times the hardware device found most often to be least like the other hardware devices to a quorum; and determining that the hardware device found most often to be least like the other hardware devices is underperforming in response to determining that the quorum has been met.

2. The method of claim 1, wherein the vector for each of the hardware devices is based on at least two performance metrics of the hardware device, wherein the number of performance metrics gathered for a particular device determines the number of dimensions of the vector that represents that device.

3. The method of claim 2, comprising calculating a statistical value for each of the performance metrics, the statistical value being derived from values from all of the hardware devices for the respective performance metric, wherein the performance metrics of the hardware device include a latest performance metric of the hardware device.

4. The method of claim 3, wherein each of the vectors is based on a deviation of the associated performance metric from the statistical value.

5. The method of claim 1, comprising calculating the projections of the vectors against each other.

6. The method of claim 5, wherein the projections of the vectors against each other are calculated using a trigonometric function applied to pairs of the vectors.

7. The method of claim 1, wherein the sub-process is performed in response to initiation of troubleshooting of the hardware devices.

8. The method of claim 7, wherein a number of iterations that the sub-process is performed is computed in response to initiation of the troubleshooting.

9. A computer program product for detecting an underperforming hardware device, the computer program product comprising a computer readable storage medium having program instructions embodied therewith, the program instructions readable and/or executable by a processor to cause the processor to:

perform the following sub-process for a plurality of iterations:
generate, by the processor, a vector for each of a plurality of hardware devices,
create, by the processor, a correlational matrix representing projections of the vectors against each other,
determine, by the processor, which hardware device is least like the other hardware devices based on the correlational matrix, and
output, by the processor, a result of the determining;
identify, by the processor, the hardware device that is most often least like the other hardware devices based on the results;
compare, by the processor, a number of times the hardware device found most often to be least like the other hardware devices to a quorum; and
determine, by the processor, that the hardware device found most often to be least like the other hardware devices is underperforming in response to determining that the quorum has been met.

10. The computer program product of claim 9, wherein the vector for each of the hardware devices is based on at least two performance metrics of the hardware device, wherein the performance metrics of the hardware device include a latest performance metric of the hardware device.

11. The computer program product of claim 10, comprising program instructions readable and/or executable by the processor to calculate a statistical value for each of the performance metrics, the statistical value being derived from values from all of the hardware devices for the respective performance metric, wherein the number of performance metrics gathered for a particular device determines the number of dimensions of the vector that represents that device.

12. The computer program product of claim 11, wherein each of the vectors is based on a deviation of the associated performance metric from the statistical value.

13. The computer program product of claim 9, comprising program instructions readable and/or executable by the processor to calculate the projections of the vectors against each other.

14. The computer program product of claim 13, wherein the projections of the vectors against each other are calculated using a trigonometric function applied to pairs of the vectors.

15. The computer program product of claim 9, wherein the sub-process is performed in response to initiation of troubleshooting of the hardware devices.

16. The computer program product of claim 15, wherein a number of iterations that the sub-process is performed is computed in response to initiation of the troubleshooting.

17. A system, comprising:
a hardware processor and logic integrated with and/or executable by the processor, the logic being configured to:
perform the following sub-process for a plurality of iterations:
generate a vector for each of a plurality of hardware devices,
create a correlational matrix representing projections of the vectors against each other,
determine which hardware device is least like the other hardware devices based on the correlational matrix, and
output a result of the determining;
identify the hardware device that is most often least like the other hardware devices based on the results;
compare a number of times the hardware device found most often to be least like the other hardware devices to a quorum;
determine that the hardware device found most often to be least like the other hardware devices is underperforming in response to determining that the quorum has been met; and
further monitor the hardware device found most often to be least like the other hardware devices in response to determining that the quorum has not been met,
wherein a number of iterations that the sub-process is performed is predefined,
wherein the quorum is defined as (predetermined number of iterations/2)+1,
wherein the result of the determining is output to a watch list,
wherein the result of the determining is output to a user interface,
wherein a pre-determined period of time elapses between each iteration of the sub-process.

18. The system of claim 17, wherein the vector for each of the hardware devices is based on at least three performance metrics of the hardware device, wherein the number of performance metrics gathered for a particular device determines the number of dimensions of the vector that represents that device.

19. The system of claim 18, comprising logic configured to calculate a statistical value for each of the performance metrics, the statistical value being derived from values from all of the hardware devices for the respective performance metric.

20. The system of claim 19, wherein each of the vectors is based on a deviation of the associated performance metric from the statistical value, wherein the sub-process is performed in response to troubleshooting of the hardware devices being initiated, wherein the number of iterations that the sub-process is performed is computed in response to initiation of the troubleshooting.

\* \* \* \* \*